L. G. Hoffman.
Hatching Eggs.
N° 4,978.   Patented Feb. 20, 1847.

UNITED STATES PATENT OFFICE.

LEWIS G. HOFFMAN, OF ALBANY, NEW YORK.

ARTIFICIAL INCUBATION.

Specification of Letters Patent No. 4,978, dated February 20, 1847.

*To all whom it may concern:*

Be it known that I, LEWIS G. HOFFMAN, of Albany, in the county of Albany and State of New York, have invented a new and Improved Apparatus for Effecting Artificial Incubation; and I do hereby declare that the following is a full, clear, and exact description of the construction and operation thereof, reference being had to the accompanying drawings, making part of this specification, in which—

Figure 1:
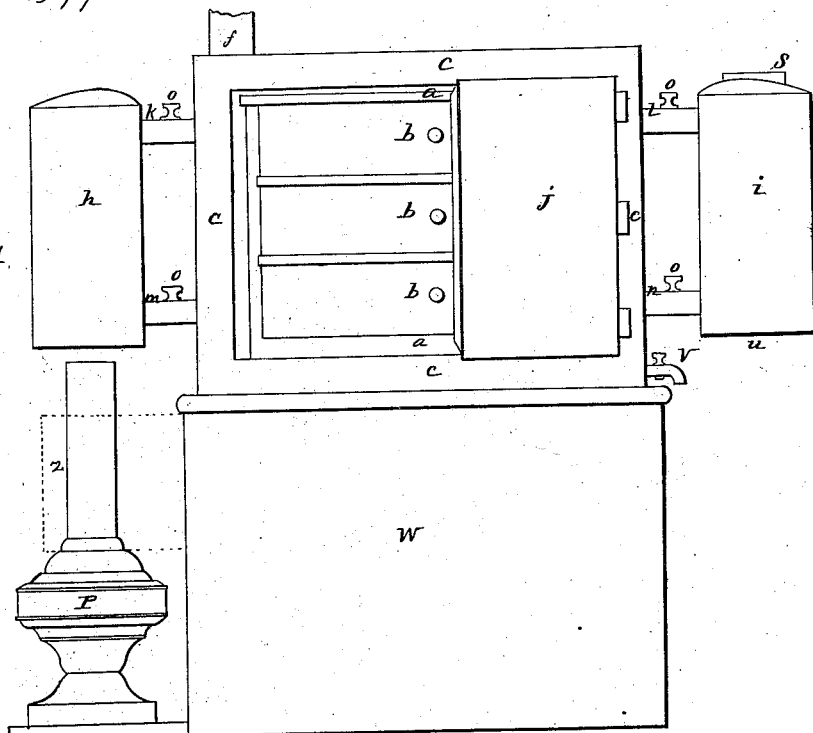
Figure 2:
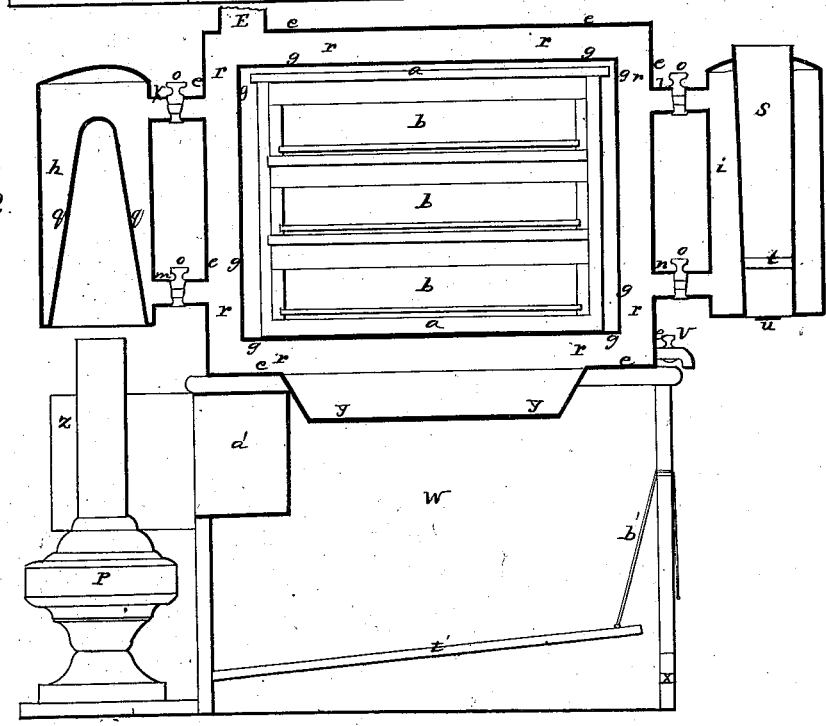

Figure 1 represents an elevation, and Fig. 2, a vertical section of my said apparatus.

The same letters refer to the same parts in both the figures.

The nature of my invention consists in the peculiar manner in which I construct my apparatus for hatching eggs by heat derived from warm water.

$a$ is a chest of wood, containing any convenient number of shallow drawers $b$ $b$ $b$, which serve to receive the eggs to be hatched. The shell of the chest, as well as the sides and bottom of the drawers is pierced with holes to allow the heated air to circulate freely. The whole is inclosed within a rectangular oven $c$ $c$ $c$ $c$, of sheet tin, the top, bottom, and three sides of which, are double, being composed of plates placed two or three inches apart, thus forming a jacket, which is to be filled with water.

In Fig. 2, $g$ $g$ are the inner, and $e$ $e$ the outer plates; $r$ $r$ being the cavity of the jacket.

$j$ is a door composed of two sheets of tin, placed a little distance apart, and inclosing a stratum of air, in order to more effectually prevent the transmission of heat from the cavity of the oven, which it serves to close.

$h$ and $i$, are two heaters of sheet tin, of a semicircular horizontal section, connected by the short tubes $k$, $l$, $m$, and $n$, with the cavity of the jacket around the oven. A stop cock $o$, in each tube, serves to cut off this communication at pleasure.

The heater $h$, is intended to be used when an Argand, solar, or other lamp $p$, is employed to generate and maintain the necessary heat. The bottom $q$ $q$, of this heater is conical, projecting upward into the body of water so as to present a greater heating surface, and render the action of the lamp more effectual.

$f$ is a short tube through which the cavity is filled with water.

$i$ is a second heater to be employed when charcoal or other similar fuel is used to generate the required heat.

$s$ is a cylindrical fire-pot, about 4 or 5 inches in diameter which drops into a vertical flue passing through this heater. It is provided with a grate $t$ as also a register $u$ at the bottom to regulate the draft admitted to the fuel, and a lid to close the top when necessary.

To put the apparatus in operation, it is only necessary, after placing the eggs within the drawers, (where they may be deposited upon cotton or other soft substances,)—to fill both the cavity of the jacket and the heaters with water,—the cocks $o$ $o$ being open. The lamp $p$, (which may be of such description as to burn lard, grease, or other cheap substitutes for oil,)— is then lighted and placed beneath the heater $h$. As the water becomes heated, an intestine motion takes place, which causes the hotter particles to pass off through the upper pipe $k$, into the cavity of the jacket, where becoming cooled, they fall, and return to the heater through the lower tube $m$, to be again put into circulation.

The heater $i$, is intended to be used during the day, with charcoal as fuel, in order to obviate the expense of the lamp,—the latter serving to keep up the heat, without attendance during the night. A thermometer is placed within the chest of drawers to ascertain the temperature, which should be about 98° Fahrenheit.

V is a cock serving to draw off the water from the cavity of the jacket.

During the first eight or ten days, the young chicks require to be cherished. For this purpose a brooding chamber $w$, is provided, consisting of what may be considered as an inverted cubical box, serving as a pedestal to the oven &c. An aperture $x$ for the ingress of the chickens, is made by cutting away a portion of the lower edge of one side of the box. In order to warm this brooding chamber, an aperture is cut in its top, to receive $y$ $y$, which is merely a projection caused by the enlargement of the jacketing at this point, serving to radiate heat into the chamber. A part of the waste heat from the lamp may be also advantageously used for the same purpose by cutting out a portion of the side of the box adjoining the lamp, and constructing from tin plate, a niche or recess $a'$ therein, the back of which shall project into the chamber. A semicircular reflector $z$, is placed around the chimney of the lamp, serving to throw the heat into this recess or niche, whence it is radiated into the chamber.

$t'$ is what I term a "Mother;"—being a light wooden frame covered upon the under side, with an undressed sheepskin. It serves for the chicks to brood under, being raised or lowered by a cord $b'$.

I claim—

1. The oven inclosing the chest of drawers, and surrounded by a jacketing formed by constructing the top, bottom and sides with double plates placed at a suitable distance apart, the interval forming a tight receptacle for water; in combination with either or both the heaters $i$ and $h;$ the former being intended to operate with charcoal or other suitable fuel, and the latter, by the flame of a lamp, as herein set forth and described.

2. I also claim the mode in which I have combined the brooding chamber with the oven, so as to be heated thereby;—viz., by cutting out a portion of the top of the former, to receive the projecting portion $y$ $y$, of the jacketing of the latter, as herein before described.

3. And I further claim the mode of throwing the waste heat of the lamp into the brooding chamber; the whole being constructed and operating substantially in the manner and for the purpose herein described.

L. G. HOFFMAN.

Witnesses:
 WM. S. ELLISON,
 R. S. G. BANCROFT.